United States Patent
Ben-Yair et al.

(10) Patent No.: US 9,645,838 B2
(45) Date of Patent: May 9, 2017

(54) AUTOMATIC DISCOVERY OF A JAVASCRIPT API

(71) Applicant: International Business Machines Corporation, Armonk, NY (US)

(72) Inventors: Yoav Ben-Yair, Mevasseret Zion (IL); Gil Fuchs, Mevasseret Zion (IL); Itai Gordon, Jerusalem (IL); Oren Paikowsky, Jerusalem (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/755,135

(22) Filed: Jun. 30, 2015

(65) Prior Publication Data

US 2017/0003989 A1    Jan. 5, 2017

(51) Int. Cl.
   *G06F 9/44*     (2006.01)
   *G06F 9/455*    (2006.01)
   *H04L 29/08*    (2006.01)
   *G06F 9/45*     (2006.01)
   *G06F 9/445*    (2006.01)

(52) U.S. Cl.
   CPC ............ *G06F 9/45529* (2013.01); *G06F 8/37* (2013.01); *G06F 8/427* (2013.01); *H04L 67/02* (2013.01); *G06F 9/4428* (2013.01); *G06F 9/44505* (2013.01)

(58) Field of Classification Search
   CPC .............. G06F 8/10–8/54; G06F 9/44–9/4893
   See application file for complete search history.

(56) References Cited

U.S. PATENT DOCUMENTS

| | | | |
|---|---|---|---|
| 7,610,406 B2* | 10/2009 | Wu | G06F 9/45529 707/999.01 |
| 8,291,230 B2 | 10/2012 | Moore et al. | |
| 8,577,914 B2 | 11/2013 | Hossain et al. | |
| 8,819,698 B2 | 8/2014 | Sandholm et al. | |
| 8,893,077 B1 | 11/2014 | Aiuto et al. | |
| 9,465,590 B2* | 10/2016 | Ivanov | G06F 8/35 |
| 2005/0154978 A1 | 7/2005 | Albornoz et al. | |
| 2007/0266176 A1* | 11/2007 | Wu | G06F 9/45529 709/242 |

(Continued)

OTHER PUBLICATIONS

Jensen, Simon Holm, et al., "Modeling the HTML DOM and Browser API in Static Analysis of JavaScript Web Applications", 2011, pp. 59-69.*

(Continued)

*Primary Examiner* — Thuy Dao
*Assistant Examiner* — Christopher Franco
(74) *Attorney, Agent, or Firm* — Gilbert Harmon, Jr.

(57) ABSTRACT

An approach to creating a canonical representation of a JavaScript API. Objects associated with the JavaScript API are instantiated, creating entry points for analysis. A list of discovered objects is created based on parsing a document object model associated with the JavaScript API. The objects are instrumented and statically analyzed, creating an infrastructure associated with the JavaScript API. The infrastructure is updated based on analyzing the objects while the interface is being used and the objects are executing. A canonical representation, based on the updated infrastructure, is generated for further operations.

17 Claims, 4 Drawing Sheets

(56) References Cited

U.S. PATENT DOCUMENTS

| | | | | |
|---|---|---|---|---|
| 2010/0185869 | A1* | 7/2010 | Moore | H04L 9/3236 713/179 |
| 2011/0016449 | A1 | 1/2011 | Yao et al. | |
| 2011/0202935 | A1 | 8/2011 | Malmer et al. | |
| 2013/0081004 | A1* | 3/2013 | Vargas | G06F 8/51 717/137 |
| 2013/0191722 | A1* | 7/2013 | Gibbs | G06F 9/45508 715/234 |
| 2014/0047413 | A1* | 2/2014 | Sheive | G06F 8/30 717/110 |
| 2014/0068414 | A1* | 3/2014 | Park | G06F 9/45529 715/234 |
| 2014/0281909 | A1 | 9/2014 | Pinto et al. | |
| 2014/0366000 | A1 | 12/2014 | Batabyal et al. | |
| 2015/0039668 | A1 | 2/2015 | Moore | |
| 2015/0154402 | A1* | 6/2015 | Arbabi | G06F 21/577 726/25 |
| 2015/0363396 | A1 | 12/2015 | Sengupta et al. | |
| 2016/0004516 | A1* | 1/2016 | Ivanov | G06F 8/34 7/106 |
| 2016/0077902 | A1* | 3/2016 | Feng | G06F 9/45529 719/328 |

OTHER PUBLICATIONS

Hedin, Daniel, et al., "Information-Flow Security for a Core of JavaScript", 2012, pp. 3-18.*

Taly, Ankur, et al., "Automated Analysis of Security-Critical JavaScript APIs", 2011, pp. 363-378.*

Liu, Yang, et al., "PAT 3: An Extensible Architecture for Building Multi-domain Model Checkers", 2011, pp. 190-199.*

Van Cutsem, Tom, et al., "Proxies: Design Principles for Robust Object-oriented Intercession APIs", 2010, pp. 59-72.*

Zhu, Xin-Hua, et al., "An Interoperable Learning Sequencing Model Based on the Flow Control Object", 2008, pp. 1217-1220.*

Ben-Yair et al., "Automatic Discovery of a Javascript API", U.S. Appl. No. 15/153,075, filed May 12, 2016, 2015, 26 pages.

IBM Appendix P, patents or patent applications treated as related, May 13, 2016, 2 pages.

Dukovich et al., "JOXM: Java Object—XML Mapping", Eighth International Conference on Web Engineering, IEEE computer society, 978-0-7695-3261-5/08 © 2008 IEEE, DOI 10.1109/ICWE.2008.43, pp. 332-335.

Hartmann et al.; "Cross-platform mobile development"; Medical Mobile Development Project: D4; Tribal; Mar. 2011, pp. 1-18.

Madsen et al.; "Practical Static Analysis of JavaScript Applications in the Presence of Frameworks and Libraries"; ESEC/FSE' 13, Aug. 18-26, 2013, Saint Petersburg, Russia; Copyright 2013; ACM; pp. 449-509.

"Rhino (JavaScript engine)", Wikipedia; Last modified: Mar. 15, 2015; pp. 1-3, <http://en.wikipedia.org/wiki/Rhino_(JavaScript_engine)>.

Ben-Yair et al., "Automatic Discovery of a Javascript API", U.S. Appl. No. 14/976,514, filed Dec. 21, 2015, 26 pages.

IBM Appendix P, list of patents and patent applications treated as related, Date, pp. 1-2.

Disclosed Anonymously et al, "A Standard Representation of Javascript APIs Created by Runtime Inspection of Javascript Objects", ip.com, An IP.com Prior Art Database Technical Disclosure, IP.com No. 000229526, Publication Date: Aug. 5, 2013, 10 pages.

Ben-Yair, Yoav et al., "Automatic Discovery of a Javascript API", U.S. Appl. No. 15/388,246, filed Dec. 22, 2016, 26 pages.

IBM Appendix P, list of patents or patent applications treated as related, Dec. 22, 2016, 2 pages.

* cited by examiner

AUTOMATIC DISCOVERY OF A JAVASCRIPT API

BACKGROUND OF THE INVENTION

The present invention relates generally to utilizing JavaScript Application Programming Interfaces (APIs) and more specifically, to optimizing the utilization of JavaScript APIs based on associated runtime platforms.

In recent years, the popularity of implementing systems with JavaScript has dramatically risen, with predictions that approximately 90% of all websites use JavaScript. Accordingly, many of these websites and their associated web applications expose JavaScript APIs for consumption by client applications on a variety of runtime platforms. With the ever present benchmark measurements of user experience and performance, consuming JavaScript APIs based on a native runtime environment of an associated platform becomes the desired path of implementation for client applications.

SUMMARY

According to an embodiment of the present invention, a method for creating a canonical representation of a JavaScript API, the method comprising: instantiating a first one or more objects, associated with the JavaScript API, for use as one or more entry points to the JavaScript API; generating a list of the first one or more objects based on recursively parsing a Document Object Model (DOM) associated with the JavaScript API; instrumenting and statically analyzing the first one or more objects for creating an infrastructure associated with the JavaScript API; creating an updated infrastructure, based on substantially simultaneous execution and analysis of the first one or more objects and a second one or more objects created based on the execution of the first one or more objects; and outputting a canonical representation of the JavaScript API based on the updated infrastructure.

According to another embodiment, a computer program product for creating a canonical representation of a JavaScript API, the computer program product comprising: one or more computer readable storage media and program instructions stored on the one or more computer readable storage media, the program instructions comprising: program instructions to instantiate a first one or more objects, associated with the JavaScript API, for use as one or more entry points to the JavaScript API; program instructions to generate a list of the first one or more objects based on recursively parsing a Document Object Model (DOM) associated with the JavaScript API; program instructions to instrument and statically analyze the first one or more objects for creating an infrastructure associated with the JavaScript API; program instructions to create an updated infrastructure, based on substantially simultaneous execution and analysis of the first one or more objects and a second one or more objects created based on the execution of the first one or more objects; and program instructions to output a canonical representation of the JavaScript API based on the updated infrastructure.

According to another embodiment, A computer system for creating a canonical representation of a JavaScript API, the computer system comprising: one or more computer processors; one or more computer readable storage media; program instructions stored on the one or more computer readable storage media for execution by at least one of the one or more computer processors, the program instructions comprising: program instructions to instantiate a first one or more objects, associated with the JavaScript API, for use as one or more entry points to the JavaScript API; program instructions to generate a list of the first one or more objects based on recursively parsing a Document Object Model (DOM) associated with the JavaScript API; program instructions to instrument and statically analyze the first one or more objects for creating an infrastructure associated with the JavaScript API; program instructions to create an updated infrastructure, based on substantially simultaneous execution and analysis of the first one or more objects and a second one or more objects created based on the execution of the first one or more objects; and program instructions to output a canonical representation of the JavaScript API based on the updated infrastructure.

DETAILED DESCRIPTION

The embodiments depicted and described herein recognize the challenges of consuming a JavaScript API in a runtime platform different than the runtime platform of the JavaScript API producer. For example, consuming a Microsoft Windows Server JavaScript API from within an Apple, Incorporated iOS mobile application can result in embedding a copy of the JavaScript API object model and portions of the object model logic in the mobile application platform. Embedding a copy of the JavaScript API object model and its associated logic in the mobile application runtime platform can result in application failures because any subsequent updates to the object model or the JavaScript API should be copied to the platform embedding the object model and/or the JavaScript API to prevent interface synchronization problems.

Embodiments will now be described in detail with reference to the figures. It should be noted for the embodiments described herein that although JavaScript is the referenced programming language, the embodiments are not limited to the JavaScript programming language, i.e., the embodiments can be applied to other programming languages.

Figure 1:
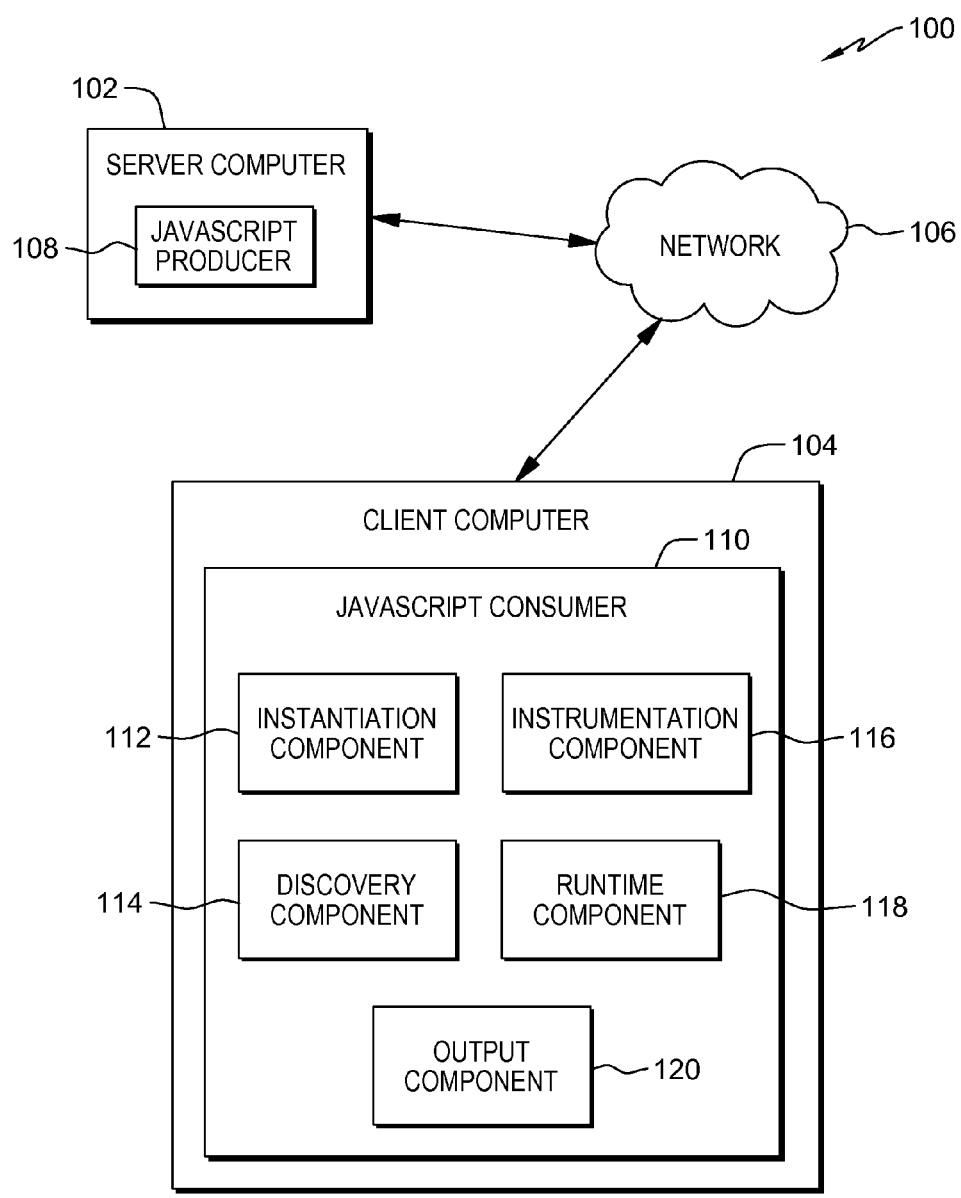
FIG. 1 is a functional block diagram illustrating a JavaScript API producer and JavaScript API consumer processing environment, in accordance with an embodiment of the present invention.

FIG. 1 is a functional block diagram illustrating, generally, an embodiment of a JavaScript API producer-consumer environment 100. The environment 100 comprises a JavaScript API producer 108 operating on a server computer 102, a JavaScript API consumer 110 operating on a client computer 104 and a network 106 supporting communications between the JavaScript API producer 108 and the JavaScript API consumer 110.

Client computer 104 can be a laptop computer, tablet computer, netbook computer, personal computer (PC), a desktop computer, a personal digital assistant (PDA), a smart phone, or any programmable electronic device capable of communicating with a server computer 102, via network 110. Server computer 102 includes JavaScript producer 108 applications for providing data and/or content via a JavaScript API. Client computer 104 can include internal and external hardware components, as depicted and described in further detail with respect to FIG. 4.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between server computer 102 and client computer 104.

JavaScript producer 108 applications can be, but are not limited to, web pages, online services or any other application presenting a JavaScript API for consumption and use by a client application. It should be noted in the embodiments that the JavaScript API consuming client application can be located on a client computer 104 or it can be located on server computer 102.

In various embodiments of the present invention, client computer 104 can be a laptop computer, tablet computer, netbook computer, personal computer (PC), a desktop computer, a personal digital assistant (PDA), a smart phone, or any programmable electronic device capable of communicating with server computer 102 via network 110. Client computer 104 includes one or more JavaScript consumer 110 applications wherein each application further comprises an instantiation component 112, a discovery component 114, an instrumentation component 116, a runtime component 118 and an output component 120. It should be noted that although separate components are enumerated to describe the operations, all of the operations can be performed by one or more components in any combination.

Instantiation component 112 of an embodiment of the present invention provides the capability to determine one or more entry points presented by a JavaScript API producer 108. For example, when a user takes an action that results in loading a web page containing JavaScript code, one or more JavaScript objects are created and the instantiation component 112 identifies these locations as one or more entry points for determining the JavaScript API associated with the JavaScript object.

Discovery component 114 of an embodiment of the present invention provides the capability to recursively parse the Document Object Model (DOM) tree of a JavaScript API and discover the existing instances of the JavaScript objects. The discovery component provides a configuration capability allowing the user to specify classes that the embodiment should exclude from the JavaScript API output. In another aspect, the discovery component provides a filter capability to exclude "built-in" classes, i.e., all instances of objects that do not belong to the JavaScript API subjected to discovery. It should be noted that a preconfigured exclusion list can be created for use during operation of discovery component 114.

Instrumentation component 116 of an embodiment of the present invention provides the capability for a static analysis of objects determined by discovery component 114 and to generate a framework for further discovery and analysis. The framework is based on an analysis of 4 elements associated with the JavaScript API comprising class hierarchy, class members, class functions and class constructors.

Runtime component 118 of an embodiment of the present invention provides the capability for a dynamic analysis of objects created based on the use of the JavaScript API. Runtime component 118 integrates results obtained from the runtime analysis into the framework generated by instrumentation component 116. Runtime component 118 performs a similar analysis, as described for instrumentation 116, with regard to the 4 elements associated with the JavaScript API comprising class hierarchy, class members, class functions and class constructors.

Output component 120 of an embodiment of the present invention provides the capability to output a canonical representation of the JavaScript API. The canonical representation of the JavaScript API allows an automatic and standard conversion of the JavaScript API to any other platform and programming language. For example, an embodiment can output a canonical Extensible Markup Language (XML) representation of the JavaScript API.

Figure 2:
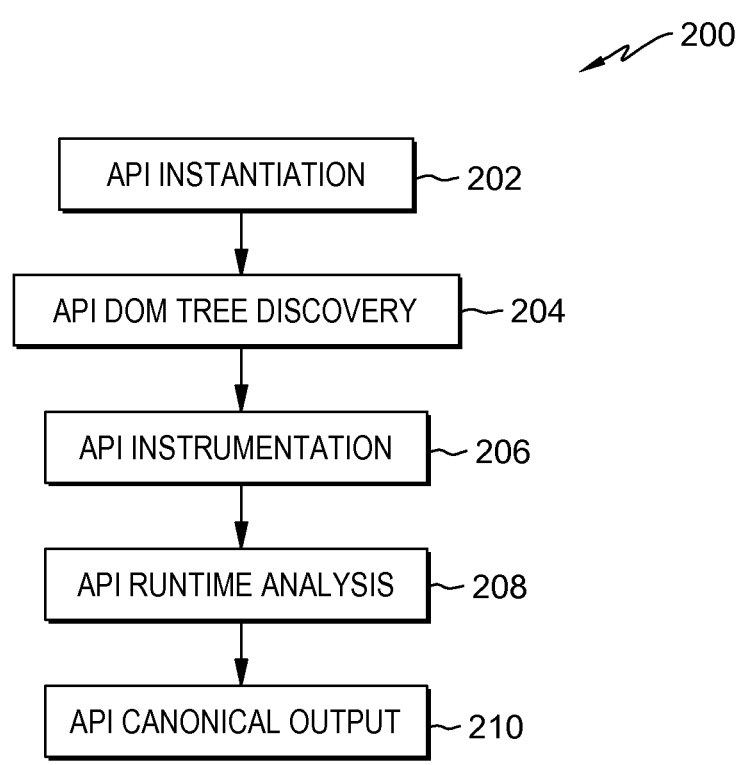
FIG. 2 is a flowchart depicting operational steps of a JavaScript API discovery program, on a computing device within the data processing environment of FIG. 1, in accordance with an embodiment of the present invention.

FIG. 2 is a flowchart 200 depicting operational steps of a JavaScript consumer 110 for discovering APIs, in accordance with an embodiment of the present invention. The flowchart 200 comprises the steps of API instantiation 202, API DOM Tree discovery 204, API instrumentation 206, API runtime analysis 208 and API canonical output 210.

The API instantiation 202 step of embodiments depicted herein determines, through instantiation component 112, an entry point for beginning the analysis of an API. It should be noted that the API can be, but is not limited to, a JavaScript API. Entry points for the API can be determined from instantiated objects associated with the API. The instantiation of an object associated with the API occurs from actions such as, but not limited to, loading a web page presenting the API for consumption or manually creating an object of the API. One example of manually creating an object can be running a unit test designed to exercise the API. Once an entry point associated with the API is determined, the embodiments can crawl through the API's object model and interface. It should be noted that crawling through an API's object model can be described, generally, as requesting data by use of the API, parsing the response to the request and creating a hierarchical structure based on the parsed data.

Looking next to the API DOM Tree discovery 204 step, embodiments of the present invention, through discovery component 114, recursively parse the DOM Tree for discovering the existing API object instances. It should be noted that in dynamic language implementations objects are not created until they are instantiated by the calling program. Accordingly, the embodiments can require a recursive procedure to walk through the objects of interest of the API.

Continuing with the API DOM Tree discovery 204 step of an embodiment, as the recursive analysis of the API continues via discovery component 114, discovery of existing object instances of the DOM Tree are stored in a data structure such as, but not limited to, a linked list of the API object instances and any associated objects presently created. A filtering capability is provided with the embodiments allowing the user to exclude "built-in" classes. It should be noted that "built-in" classes are instances of discovered classes that do not belong to the API. Further, a configuration function provides the capability for the user to predetermine instances of API classes that the user desires excluded from the discovered API output.

Next, the API instrumentation 206 step of an embodiment provides the capability to analyze/instrument the presently discovered objects and create an infrastructure for further analysis through instrumentation component 116. For each instance previously discovered, a four-pronged analysis is performed which includes instrumenting, based on callback functions, the discovered objects. The four-pronged analysis comprises determining class hierarchy, class members, class functions and class constructors.

The class hierarchy analysis is based on a building a tree-like data structure for storing data associated with the class hierarchy such as, but not limited to, class inheritance, class member origin, class method origin, class method overrides, etc. It should be noted that the tree-like data structure is dynamic in that the data describing the API evolves as the analysis progresses and elements of the tree-like data structure can move to different locations (positions) within the tree-like data structure. The class hierarchy analysis provides for the discovery of a general hierarchy of the currently instantiated objects, assigning ownership of discovered class members to discovered classes and assigning ownership of discovered class methods to discovered classes. It should be noted that the aforementioned assignments can change based on additional object instantiation and/or the discovery of parameters and parameter types as the analysis progresses.

The class member analysis comprises determining and storing a class member name and data type of any value assigned to each discovered class member. Instrumentation is inserted via a callback function attached to each class member providing the capability to "watch" the class member and receive notification as values are assigned to the class member, i.e., the callback function is invoked each time a value is assigned to the class member.

The class function analysis is based on determining parameter types and return value types. Initially, the class function parameter names, if any, are discovered and stored. Next, further instrumentation is inserted, e.g., the original class function is replaced with a function having the same name and body but including a first callback function at the beginning and a second callback function at the end. The first callback function provides the capability to discover the number and types of parameters passed to the class function and the second callback function provides the capability to discover the types of values returned from the class function as the analysis progresses.

The class constructor analysis is similar to the class function analysis with regard to parameter types but because a constructor does not return a value, there is no requirement for determining the return value type.

Continuing with the API runtime analysis 208 step of an embodiment, the API is analyzed, by runtime component 118, while being exercised. It should be noted that the API can be exercised by either manual usage or automatic usage wherein an example of manual usage is a user clicking on different objects of a web page and an example of automatic usage is a test tool running a unit test associated with the API. It should further be noted that the API usage can be limited to relevant parts of the API wherein relevant is defined as those parts of interest to the user.

Based on the instrumentation previously inserted by instrumentation component 116, in general, class function invocations, parameters passed to a class functions, class member assignments and class function return values are tracked for updating the infrastructure data tree. Further, any new class types discovered are added to the tree and instrumented, as previously described, for tracking. It should be noted that examples of new class type discoveries can be, but are not limited to, discovery based on assignment to a class member of a known class type, passed as a parameter to a known class function and returned from a known class function. As previously described, for each new class type a four-pronged analysis is performed which includes instrumenting, based on callback functions, the discovered objects. The four-pronged analysis comprises determining class hierarchy, class members, class functions and class constructors.

The runtime class hierarchy analysis determines changes in the class hierarchy as the API is exercised. The class hierarchy can change by events such as, but not limited to, discovery of a new class and a class member or a class method moving to a different location of the class hierarchy based on input parameters. It should be noted that a newly discovered class can be a parent and/or a child of a known class.

Figure 3:
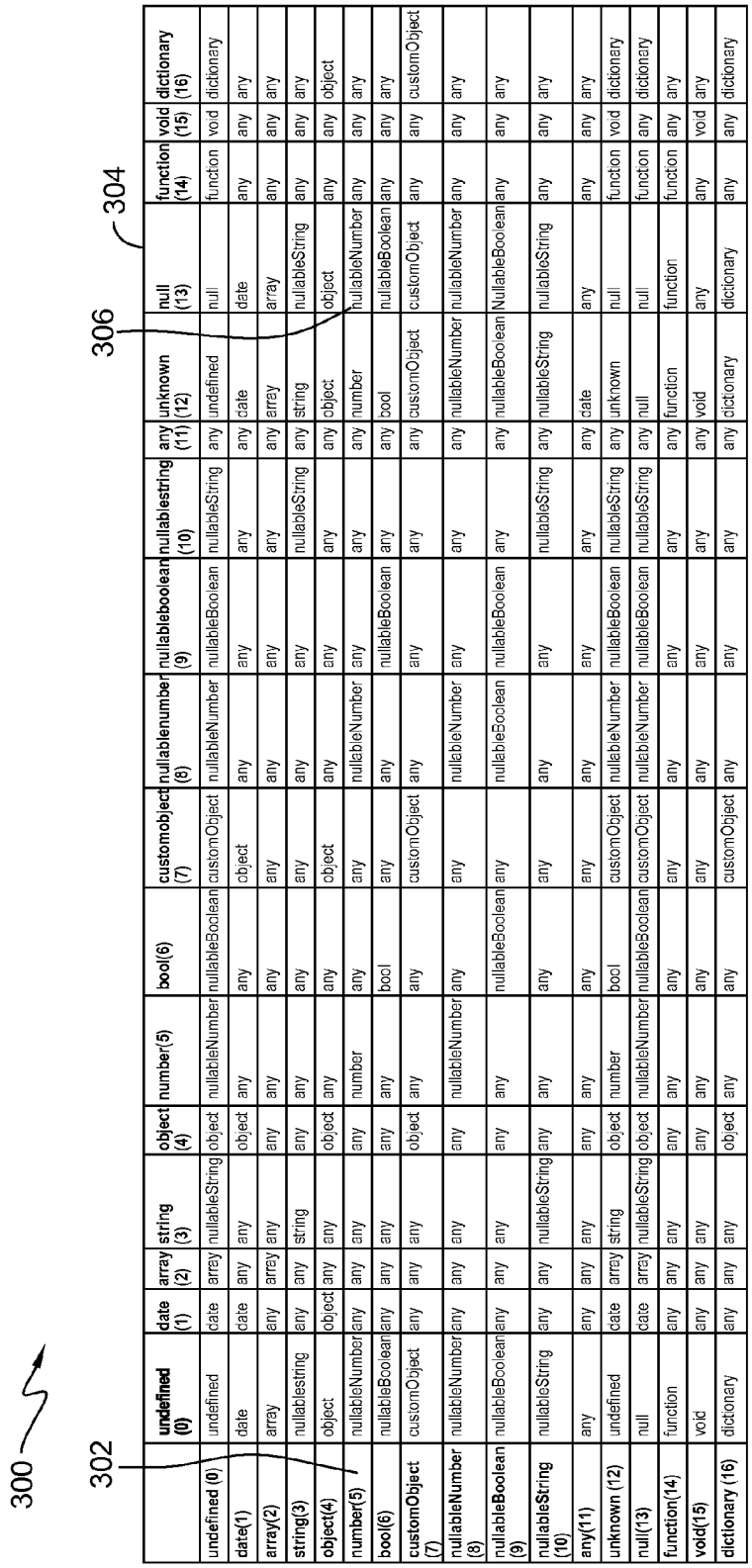
FIG. 3 is a table depicting JavaScript API data type mappings, in accordance with an embodiment of the present invention.

The runtime class member analysis monitors each assignment of previously discovered class members through invocation of the previously inserted callback function. The callback function utilizes a data type matrix 300, depicted in FIG. 3 to determine the true type of the class member. For example, if during one invocation of the callback function it is determined a class member was assigned a number 302 and during another invocation of the callback function it is determined the class member was assigned a null 304, the data type matrix 300 indicates the class member is a nullable number 306 type and the type is recorded in the tree-like data structure.

The runtime class function analysis monitors each invocation of the class functions via the previously installed callback functions. The class functions are analyzed based on the input parameters and the return value. The analysis comprises comparing the stored count of input parameters and their types to the count of input parameters and their types of the current invocation and comparing the stored return type to the return type of the current invocation. Based on these comparisons, conclusions can be drawn as follows: a class function has optional parameters if the count of input parameters is different for different invocations of the class function; the true type of input parameters and return values can be determined based on use of the data type matrix as previously described; an overloaded class function can be determined if commonality does not exist between input parameters for different invocations of the class function, e.g., a class function invoked once with two numbers for parameters and another invocation with a number and a string for parameters results in a determination of an overload condition; and a parameter type belongs to a parent class of a previously known class based on previously stored inheritance information.

The runtime class constructor analysis is similar to the runtime class function analysis with regard to parameter types but because a constructor does not return a value, there is no requirement for determining the return value type.

Next, the API canonical output 210 step provides the capability, via output component 120, to construct a canonical representation of the discovered API allowing an automatic and standard conversion to any platform and programming language. For example, a canonical representation of the discovered API can be output in an XML format for use by any programming language on any platform.

Figure 4:
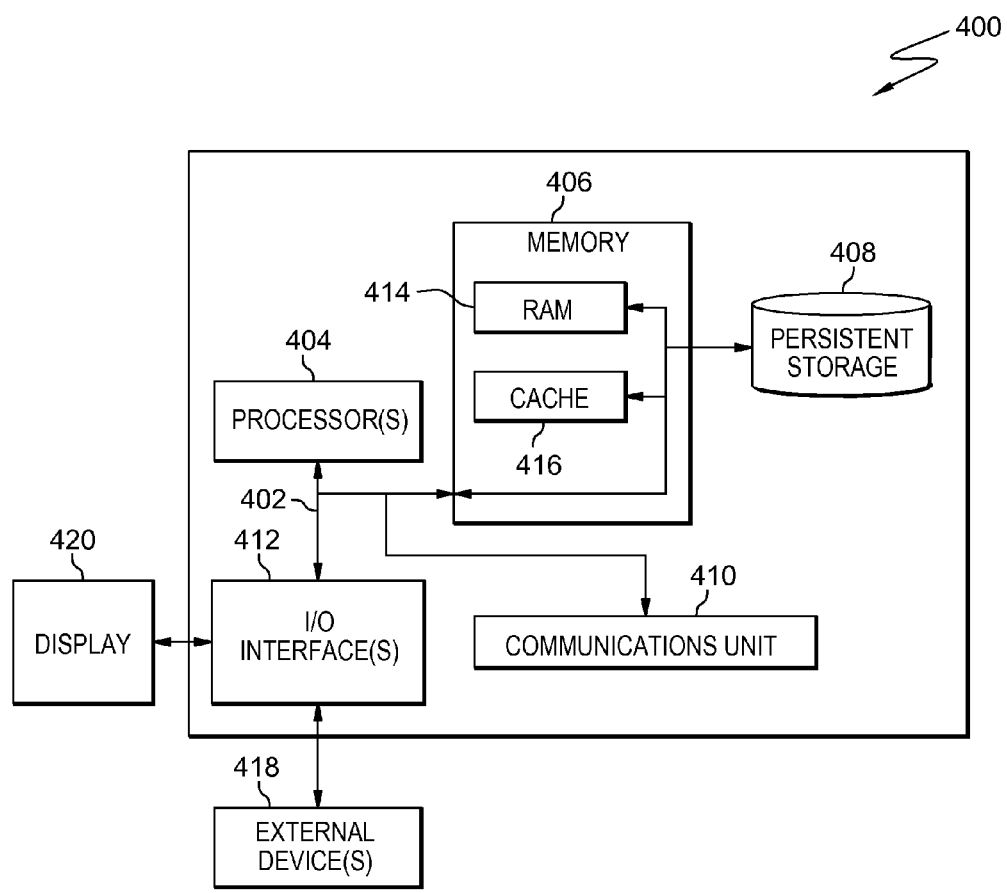
FIG. 4 is a block diagram of components of the client computer executing a JavaScript API consumer program, in accordance with an embodiment of the present invention.

FIG. 4 depicts a block diagram of components of client computer 104 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computer 104 includes communications fabric 402, which provides communications between computer processor(s) 404, memory 406, persistent storage 408, communications unit 410, and input/output (I/O) interface(s) 412.

Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Instantiation component 112, discovery component 114, instrumentation component 116, runtime component 118 and output component 120 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid 112 and client computer 104. In these examples, communications unit 410 includes one or more network interface cards. Communications unit 410 may provide communications through the use of either or both physical and wireless communications links. Instantiation component 112, discovery component 114, instrumentation component 116, runtime component 118 and output component 120 may be downloaded to persistent storage 408 through communications unit 410.

I/O interface(s) 412 allows for input and output of data with other devices that may be connected to client computer 104. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., Instantiation component 112, discovery component 114, instrumentation component 116, runtime component 118 and output component 120, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a canonical representation of a JavaScript Application Programming Interface (API), the method comprising:
    instantiating a first one or more objects, associated with the JavaScript API, for use as one or more entry points to the JavaScript API;
    generating a list of the first one or more objects based on recursively parsing a Document Object Model (DOM) associated with the JavaScript API;
    instrumenting and statically analyzing the first one or more objects for creating an infrastructure associated with the JavaScript API, wherein instrumenting further comprises:
    attaching a respective callback function to each of the one or more class members for invocation each time each of the one or more class members are assigned a value, for determining a data type of each value;
    replacing each of the one or more class functions with a respective first function that invokes a respective first callback function for analyzing input parameter types associated with a replaced function, invokes the replaced function and invokes a second callback function for determining a return type associated with the replaced function; and
    replacing each of the one or more constructors with a respective second function that invokes a respective third callback function for determining input parameter types associated with a replaced constructor and invokes the replaced constructor;
    creating an updated infrastructure, based on simultaneous execution and analysis of the first one or more objects and a second one or more objects created based on the execution of the first one or more objects; and
    outputting a canonical representation of the JavaScript API based on the updated infrastructure.

2. The method of claim 1, wherein generating further comprises:
    filtering the first one or more objects to only include objects associated with the JavaScript API and to exclude objects specified in a preconfigured exclusion list.

3. The method of claim 1, wherein statically analyzing comprises an analysis based on class hierarchy, one or more class members, one or more class functions and one or more class constructors.

4. The method of claim 1, wherein analyzing input parameter types and return types is based on a data type matrix.

5. The method of claim 1 wherein the canonical representation of the JavaScript API is based on extensible markup language (XML).

6. The method of claim 1, wherein the updated infrastructure is a tree-like data structure.

7. The method of claim 1, wherein elements of the infrastructure change positions based on at least one of determining a return type and determining input parameter types.

8. A computer program product for creating a canonical representation of a JavaScript Application Programming Interface (API), the computer program product comprising:
one or more computer readable storage media and program instructions stored on the one or more computer readable storage media, the program instructions comprising:
program instructions to instantiate a first one or more objects, associated with the JavaScript API, for use as one or more entry points to the JavaScript API, wherein the program instructions to instrument further comprises:
program instructions to attach a respective callback function to each of the one or more class members for invocation each time each of the one or more class members are assigned a value, for determining a data type of the value:
program instructions to replace each of the one or more class functions with a respective first function that invokes a respective first callback function for analyzing input parameter types associated with a replaced function, invokes the replaced function and invokes a second callback function for determining a return type associated with the replaced function: and
program instructions to replace each of the one or more constructors with a respective second function that invokes a respective third callback function for determining input parameter types associated with a replaced constructor and invokes the replaced constructor;
program instructions to generate a list of the first one or more objects based on recursively parsing a Document Object Model (DOM) associated with the JavaScript API;
program instructions to instrument and statically analyze the first one or more objects for creating an infrastructure associated with the JavaScript API;
program instructions to create an updated infrastructure, based on simultaneous execution and analysis of the first one or more objects and a second one or more objects created based on the execution of the first one or more objects; and
program instructions to output a canonical representation of the JavaScript API based on the updated infrastructure.

9. The computer program product of claim 8, wherein program instructions to instrument further comprise:
program instructions to filter the first one or more objects to only include objects associated with the JavaScript API and to exclude objects specified in a preconfigured exclusion list.

10. The computer program product of claim 8, wherein program instructions to statically analyze are based on at least one of class hierarchy, one or more class members, one or more class functions and one or more class constructors.

11. The computer program product of claim 8, wherein analyzing input parameter types and return types is based on a data type matrix.

12. The computer program product of claim 8, wherein the canonical representation of the JavaScript API is based on extensible markup language (XML).

13. A computer system for creating a canonical representation of a JavaScript Application Programming Interface (API), the computer system comprising:
one or more computer processors;
one or more computer readable storage media;
program instructions stored on the one or more computer readable storage media for execution by at least one of the one or more computer processors, the program instructions comprising:
program instructions to instantiate a first one or more objects, associated with the JavaScript API, for use as one or more entry points to the JavaScript API;
program instructions to generate a list of the first one or more objects based on recursively parsing a Document Object Model (DOM) associated with the JavaScript API;
program instructions to instrument and statically analyze the first one or more objects for creating an infrastructure associated with the JavaScript API, wherein the program instructions to instrument further comprises:
program instructions to attach a respective callback function to each of the one or more class members for invocation each time each of the one or more class members are assigned a value, for determining a data type of the value;
program instructions to replace each of the one or more class functions with a respective first function that invokes a respective first callback function for analyzing input parameter types associated with a replaced function, invokes the replaced function and invokes a second callback function for determining a return type associated with the replaced function; and
program instructions to replace each of the one or more constructors with a respective second function that invokes a respective third callback function for determining input parameter types associated with a replaced constructor and invokes the replaced constructor;
program instructions to create an updated infrastructure, based on simultaneous execution and analysis of the first one or more objects and a second one or more objects created based on the execution of the first one or more objects; and
program instructions to output a canonical representation of the JavaScript API based on the updated infrastructure.

14. The computer system of claim 13, wherein program instructions to instrument further comprise:
program instructions to filter the first one or more objects to only include objects associated with the JavaScript API and to exclude objects specified in a preconfigured exclusion list.

15. The computer system of claim 13, wherein analyzing input parameter types and return types is based on a data type matrix.

16. The computer system of claim 13, wherein elements of the infrastructure change positions based on at least one of determining a return type and determining input parameter types.

17. The computer system of claim 13, wherein an overloaded class function is determined based on no commonality between respective input parameters for a plurality of invocations of a class function.

* * * * *